(12) United States Patent
Han

(10) Patent No.: US 6,952,469 B2
(45) Date of Patent: Oct. 4, 2005

(54) METHOD AND APPARATUS FOR TRANSMITTING AND RECEIVING A MESSAGE USING CALLER ID

(75) Inventor: Sang Hyun Han, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/725,473

(22) Filed: Nov. 30, 2000

(65) Prior Publication Data

US 2001/0002209 A1 May 31, 2001

(30) Foreign Application Priority Data

Nov. 30, 1999 (KR) ........................................ 1999-53983

(51) Int. Cl.[7] .............................................. H04M 1/56
(52) U.S. Cl. ............................. 379/142.17; 379/142.13
(58) Field of Search ........................ 379/142.01, 142.06, 379/142.08, 142.09, 93.23, 93.17, 142.1, 142.13, 142.14, 142.16, 142.17; 455/415; 705/27, 1; 709/200, 218; 348/473

(56) References Cited

U.S. PATENT DOCUMENTS

| | | | | |
|---|---|---|---|---|
| 5,448,625 A | * | 9/1995 | Lederman ................. | 379/88.25 |
| 5,570,295 A | * | 10/1996 | Isenberg et al. ......... | 379/90.01 |
| 5,737,400 A | * | 4/1998 | Bagchi et al. | |
| 5,751,795 A | * | 5/1998 | Hassler et al. ......... | 379/265.03 |
| 5,768,528 A | * | 6/1998 | Stumm ..................... | 379/93.25 |
| 5,901,209 A | * | 5/1999 | Tannenbaum et al. . | 379/142.09 |
| 5,907,604 A | * | 5/1999 | Hsu ....................... | 379/142.06 |
| 5,999,526 A | * | 12/1999 | Garland et al. | |
| 6,052,444 A | * | 4/2000 | Ferry et al. .............. | 379/93.35 |
| 6,192,116 B1 | * | 2/2001 | Mayak ................... | 379/142.08 |
| 6,304,651 B1 | * | 10/2001 | Cramer et al. ......... | 379/221.01 |
| 6,327,359 B1 | * | 12/2001 | Kang et al. ............ | 379/221.08 |
| 6,427,009 B1 | * | 7/2002 | Reese .................... | 379/215.01 |
| 6,618,474 B1 | * | 9/2003 | Reese .................... | 379/142.17 |

* cited by examiner

*Primary Examiner*—Curtis Kuntz
*Assistant Examiner*—Barry W Taylor
(74) *Attorney, Agent, or Firm*—Fleshner & Kim LLP

(57) ABSTRACT

An apparatus and method for transmitting and receiving a message using a caller ID is disclosed. In a preferred embodiment, it includes an advertiser and an advertisement service company unit adapted to provide an advertisement. The advertisement service company unit includes an embedded device for inputting and modulating information. A cable/mobile communication company unit adapted to provide a communication network to the advertisement service company unit is also provided so that the advertisement service company can use the communication network. The cable/mobile communication company unit includes an embedded device to demodulate and transmit the information. An advertisement service subscriber unit, adapted to be provided with the advertisement from the advertisement service company unit through the cable/mobile communication company unit is also provided. The advertisement service subscriber unit includes a device to demodulate and identify the received information, and an embedded display unit.

32 Claims, 2 Drawing Sheets

— Prior Art —

METHOD AND APPARATUS FOR TRANSMITTING AND RECEIVING A MESSAGE USING CALLER ID

BACKGROUND OF THE INVENTION

1. Field of the Invention

The present invention relates to a method and apparatus for transmitting and receiving message on a communications network, and more particularly, to a method and apparatus for receiving a text message using a caller ID unit adapted for receiving text messages.

2. Background of the Related Art

In general, a caller (calling party) ID refers to an identifier used in an identification function for informing a called party of the caller's name and telephone number, the time of call (i.e., the time when the caller tries to make a telephone call to a called party), and the like. The identification of the caller is determined by interpreting data conforming to CCITT (International Telegraph and Telephone Consultative Committee), V.23,or BELL202 standard, which is received between a first ring signal and a second ring signal, or prior to the first ring when the called party gets an incoming phone call.

Conventionally, advertising services have been available using telephones. Specifically, a telephone or a terminal receives an advertisement message for the associated advertisement service subscriber (hereinafter, referred to as "subscriber"). The subscriber listens to the received advertisement through his/her telephone or a cellular phone. The subscriber is then paid a prescribed amount of money for the subscriber's listening to the advertisement.

FIG. 1 is a block diagram illustrating the construction of a related art system for transmitting and receiving an advertisement character message through a telephone or a terminal.

Referring to FIG. 1, there is shown the system for transmitting and receiving an advertisement character message. It includes an advertisement service company unit 20, a cable communication or mobile communication company unit 30, and an advertisement service subscriber unit (hereinafter, referred to as "subscriber unit") 40.

The advertisement service company unit 20 is adapted to produce and provide an advertisement when an advertiser (i.e., sponsor) pays advertising fees and/or charges. The advertiser thus requests that the advertisement be provided to subscribers of the advertisement service company unit 20.

The cable communication or mobile communication company unit 30 is adapted to provide communication service to the advertisement service company unit 20, so that it can use a communication network to send the advertisement to subscribers. The subscriber unit 40 is adapted to receive the advertisement telephone call through the cable communication or mobile communication company unit 30 when the subscriber joins the advertisement service company as a member. That is, the subscriber joins the advertisement receiving service and selects certain advertisement service starting times and the number of times for the service to be provided. The subscriber thus receives the advertisements.

The operation of the system for transmitting and receiving advertisement messages as described above will be described with reference to FIG. 1.

First, when the advertiser 10 makes a payment of a certain amount of money for an advertisement to the advertisement service company 20, and requests that the advertisement be sent. The advertisement service company 20 makes an advertisement telephone call to a subscriber through an advertisement receiving service from the cable communication/mobile communication company unit 30. The advertisement service company 20 makes these calls according to the subscriber's selection of a certain advertisement service starting time, and the number of times that the service should be provided.

At this time, since the service time and the number of times the subscriber receives advertisement messages is set at the subscriber's option, when a subscriber increases the frequency of the incoming advertisement messages, the amount of money for the receipt of the advertisement messages that accumulates in his/her account increases.

For example, when the subscriber sets a value of the number of times for the advertisement service to be provided to three (3), for example by selecting the advertisement service starting time of 9 a.m., 3 p.m., and 9 p.m., the advertisement service company makes an advertisement telephone call to the subscriber unit 40 through the cable communication or mobile communication company unit 30 at the corresponding advertisement service starting time. The subscriber can thus hear the advertisement character message incoming through his/her telephone or mobile terminal at those times.

The related art system and method has several problems. For example, in the related art system, a subscriber can receive only voice advertisement messages in real time. For this reason, there has been a problem in that if the subscriber is away from the telephone for a moment or on another call, the subscriber cannot receive the scheduled voice advertisement message. An automatic answering telephone may be used to receive the advertisement message, but that can be expensive and may not be available to the subscriber. Accordingly, use of service may require additional cost or may be unavailable to the subscriber.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

An object of the present invention is to provide a method and apparatus for receiving an advertisement character message using a caller ID, which is adapted to receive the advertisement character message through a telephone or a terminal.

Another object of the present invention is to provide a method and apparatus for receiving an advertisement character message using a caller ID, which demands payment of the corresponding amount of money for the reception of the advertisement character message through to the caller ID.

In order to achieve at least these objects, in whole or in parts, there is provided an apparatus for transmitting and receiving a message using a caller ID; comprising an advertiser, an advertisement service company unit adapted to provide an advertisement, the advertisement service company unit having a unit for inputting and modulating information embedded therein, a cable/mobile communication company unit adapted to provide a communication network to the advertisement service company unit so that the advertisement service company can use the communication network, the cable/mobile communication company unit having a unit for demodulating and transmitting the information embedded therein, and an advertisement service subscriber unit adapted to be provided with the advertisement from the advertisement service company unit through the cable/mobile communication company unit, the advertisement service subscriber unit having a unit for demodulating and identifying the information and a display unit embedded therein.

In order to further achieve at least the above objects, in whole or in parts, there is also provided a method for transmitting and receiving a message using a caller ID, comprising inputting information on advertisement service subscribers and an advertisement message, modulating the inputted advertisement service subscribers information and advertisement message, and information on a caller (calling party), transmitting the modulated advertisement service subscribers information, advertisement message and caller information, receiving the transmitted advertisement service subscribers information, advertisement message and caller information, and then demodulating the advertisement message and caller information of the received advertisement service subscribers information, advertisement message and caller information, modulating the demodulated advertisement message and caller information, and then transmitting the modulated advertisement message and caller information, receiving the transmitted advertisement message and caller information, and then demodulating the received advertisement message and caller information, displaying the demodulated caller information on a display section, displaying the contents of the demodulated advertisement message on the display section, and then listing the displayed advertisement message contents to store the listed advertisement message contents in a memory, and identifying the stored advertisement message contents.

According to the preferred embodiment of the present invention, an advertisement service subscriber can read an incoming advertisement text message received by the advertisement service subscriber unit, such as, for example, a telephone or a terminal, from an advertisement service company through a cable/mobile communication company in real time. Alternatively, the subscriber can read the received advertisement any time after receipt by storing the incoming advertisement character message in a memory. In addition, the advertisement service subscriber can be paid a certain amount of money for the reception of the advertisement character message according to caller IDs. Further, an advertisement effect can be spread to subscribers more efficiently.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
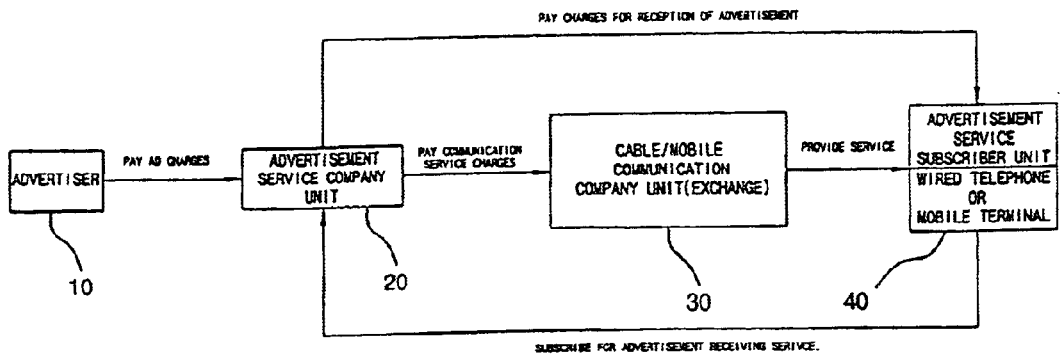
FIG. 1 is a block diagram illustrating the construction of a related art system for transmitting and receiving an advertisement character message through a telephone or a terminal.
Figure 2:
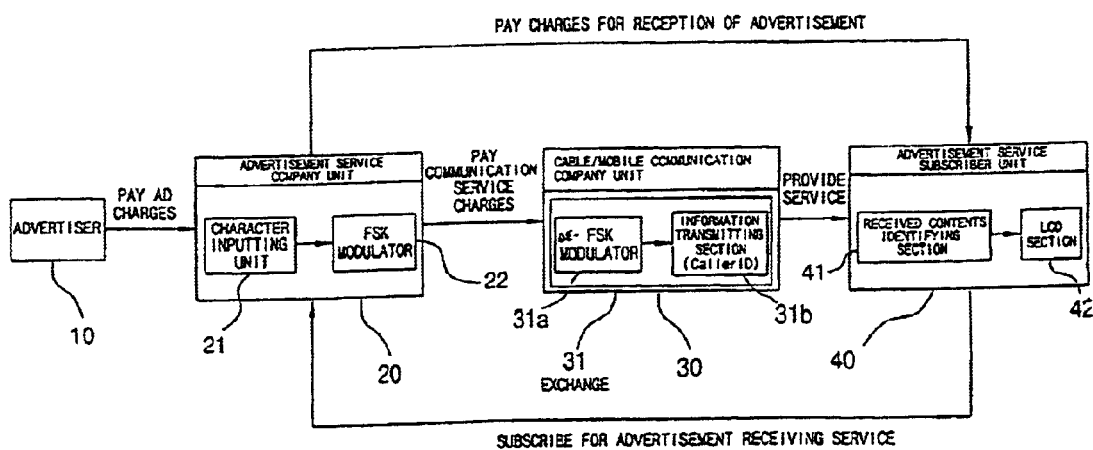
FIG. 2 is a block diagram illustrating the construction of a system for transmitting and receiving an advertisement character message through a telephone or a terminal according to a preferred embodiment of the present invention.

FIG. 2 is a block diagram illustrating the construction of a system for transmitting and receiving an advertisement character message, for example a text and/or graphics message, through a telephone or a terminal according to a preferred embodiment of the present invention. The same reference numerals will be used to designate the same constituents as those in the related art.

Referring to FIG. 2, the system for transmitting and receiving an advertisement character message includes an advertisement service company unit 20, a cable communication or mobile communication company unit 30, and a subscriber unit 40.

The advertisement service company unit 20 is adapted to produce and provide an advertisement when an advertiser (i.e., sponsor) pays advertising fees and/or charges to request that an advertisement be provided to a subscriber or the advertisement service company unit 20. The cable communication or mobile communication company unit 30 is adapted to provide a communication service to the advertisement service company unit 20. Thus, the advertisement service company unit 20 can use a communication network to send the advertisement to subscribers.

The subscriber unit 40 is adapted to receive advertisement telephone calls sent through the cable communication or mobile communication company unit 30 when the subscriber joins the advertisement service company as a member. The subscriber preferably selects a certain advertisement service starting time and the number of times for the service to be provided. However, under the system and method of the preferred embodiment, this is not necessary.

The advertisement service company unit 20, the cable communication or mobile communication company unit 30, and the subscriber unit 40 preferably include a modem to support the advertisement service company ID, i.e., a caller ID, modulating/demodulating a signal. Any method or device of supporting the caller ID signal can be used, however. The modem or other unit for performing the same functions is preferably embedded in each unit, and can also serve to perform a calling function.

The advertisement service company unit 20 preferably includes a character-inputting unit 21, for inputting items of information such as characters and numerals, or other graphical or textual information (for example, a telephone number, a message, and the like). The advertisement service company unit 20 also includes a Frequency Shift Keying FSK) modulator 22, for modulating the inputted information to be suitable for transmission to the cable/mobile communication company unit 30. The FSK modulator is preferably embedded within the advertisement service company unit 20. Additionally, any suitable modulator or modulation method could be used.

The cable/mobile communication company unit 30 includes a demodulator 31a corresponding to the modulator 22; in this example a FSK modulator 31a is provided. The demodulator 31a demodulates the modulated information inputted thereto from the advertisement service company unit 20. The cable/mobile communication company unit 30 further includes an information transmitting section 31b for modulating the demodulated information for transmission to the subscriber unit 40. The information transmitting section 31b is preferably embedded in the unit 30.

The subscriber unit 40 preferably includes a received contents identifying section 41 for demodulating the modulated information (a telephone number or a text message, for example) inputted thereto from the cable/mobile communication company unit 30. The contents identifying section 41 identifies the contents of the demodulated information. An LCD section 42 is provided for displaying the identified contents of the received information.

Figure 3A:
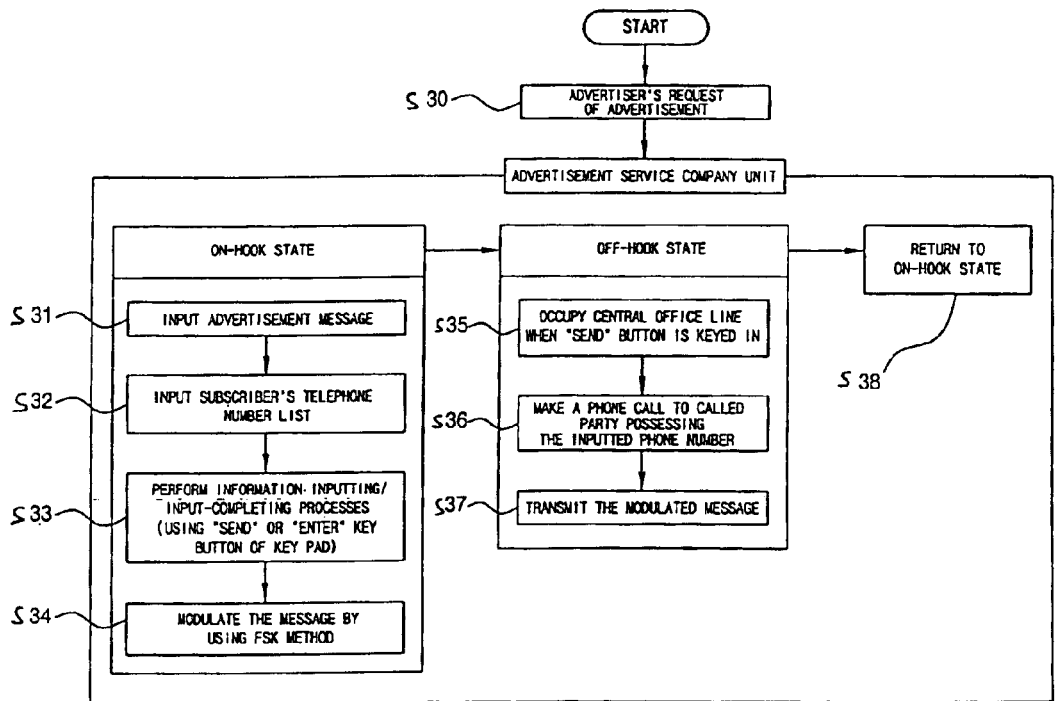
FIGS. 3a, 3b, and 3c are flow charts illustrating a process for transmitting and receiving an advertisement character message through a telephone or a terminal according to the preferred embodiment of the present invention.
Figure 3B:
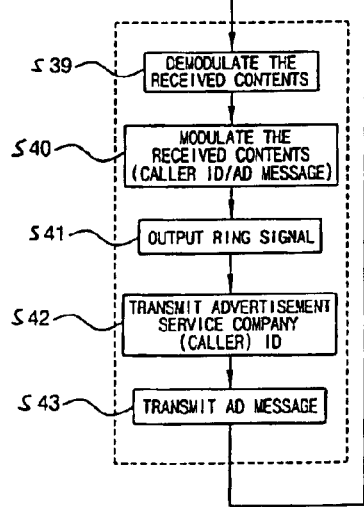
Figure 3C:
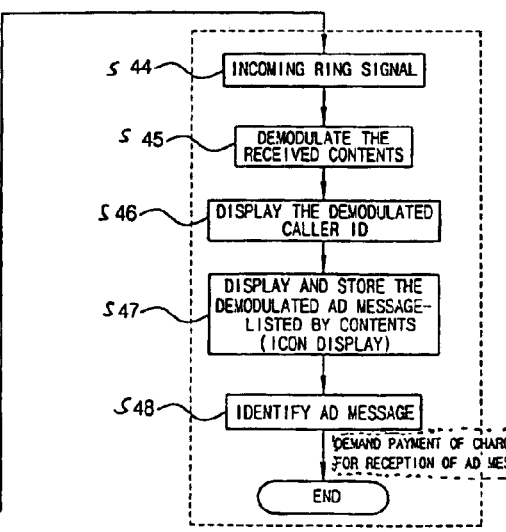

FIGS. 3a, 3b, and 3c are flow charts illustrating a process for transmitting and receiving an advertisement character message through a telephone or a terminal using a caller ID, according to a preferred embodiment of the present invention.

For purposes of example, reference will be made to the FSK type modulation and demodulation methods employed as one embodiment in the advertisement service company unit 20, the cable communication or mobile communication company unit 30, and the subscriber unit 40 according to the present invention. It should be understood that any modulation method could be used.

First, when an advertisement message, for example a character, is inputted to the character-inputting unit 21 of the advertisement service company unit 20. A CPU, (not shown) preferably within the advertisement service company unit 20, receives the input outputs a digital signal corresponding to the inputted advertisement character through a CPU port. Preferably, each bit of the inputted character, represented as a binary string, is converted to a digital signal.

For example, in the case where a character "A" is inputted to the character-inputting unit 21, the CPU generally outputs "0000 0001" as a binary data of "A", which has already been programmed in a CPU register through the CPU port. In the preferred embodiment of the present invention, the CPU converts corresponding bits 0 and 1 into signals with caller ID modulation standard frequencies, i.e., signals of 2100 Hz and 1300 Hz (a case of CCITT V.23), respectively, to output them through the CPU port. Therefore, when the binary data of a corresponding bit of the inputted advertisement character is "0," a signal outputted from the CPU port changes 2100 times per second between a low value and a high value. Since a signal having such a frequency is not a RF high-frequency signal, the CPU can produce the signal easily.

Since the frequency signal outputted from the CPU is in the form of a sine wave, high-frequency components of the sine wave form are removed by a low pass filter (LPF) to form a sine wave. The resultant signal is preferably inputted to the cable/mobile communication company unit 30 through a central office line. In this example, since a signal bandwidth used in the central office line is too small to transmit high-frequency components, the frequency signal passing through the central office line must first be formed into a low-frequency sine wave. This, however, is only one example, and other methods of matching the bandwidth are possible. Thus, the frequency signal will be formed into other frequency bands.

Next, demodulation will be described. Recall that for this example, it is assumed that FSK modulation is used. The modulated signal outputted from the advertisement service company unit 20 is inputted to the cable/mobile communication company unit 30, and is converted into the original signal. In this example the original signal is a sine wave. That is, the modulated signal inputted to the cable/mobile communication company unit 30 is a low-frequency sine wave signal. In order for the CPU of the cable/mobile communication company unit 30 to recognize the inputted signal, it must first be restored to the original sine wave. For this purpose, when the cable/mobile communication company unit 30 processes the inputted signal through an amplifier having a large gain so that it become saturated. The inputted signal thus becomes a sine wave signal. In addition to this method, various other methods including using a dedicated chip, can be implemented to form a sine wave signal.

After the input signal has been formed into the sine wave, the CPU of the cable/mobile communication company unit 30 reads a frequency inputted thereto, preferably by using an internal counter. The CPU preferably reads a value of the frequency inputted to a serial port of the CPU. If it is determined that the frequency value is 2100 Hz, the CPU recognizes the binary data of a corresponding bit of the inputted advertisement character as "0". On the other hand, if it is determined that the frequency value is 1300 Hz, the CPU recognizes the binary data of a corresponding bit of the inputted advertisement character as "1" (it should be understood that these values pertain to using CCITT V.23; other standards could also be used).

The CPU then stores the recognized binary data in a register or other memory. At this time, if it is determined that a byte value of the binary data of each of the bits of the inputted advertisement character is "0000 0001" stored in predetermined register, the CPU recognizes it as the character "A" corresponding to the byte value. As a result, the cable/mobile communication company unit 30 can recognize the advertisement character data inputted thereto from the advertisement service company unit 20.

It can be seen from the foregoing that the above FSK type modulation and demodulation methods can be applied equally to the cable/mobile communication company unit 30.

Now, the method of implementing preferred embodiment of the present invention will be described with reference to the drawings.

Referring to FIG. 3a, the advertiser (sponsor) 10 first requests an advertisement to the advertisement service company unit 20, as shown in step S30. An operator of the advertisement service company unit 20 accordingly inputs an advertisement, such as a character message, to the character-inputting unit 21, as shown in step S31. This input is preferably performed while a state mode of the character-inputting unit 21 of the advertisement service company unit 20 is in an on-hook state.

Next, the operator of the advertisement service company unit 20 inputs address information, for example a telephone number, of each subscriber, as shown in step S32. The operator completes the information inputting process by using a "SEND" or "ENTER" key button included in a key pad of the character inputting-unit 21, as shown in step S33. The information inputting/input-completing processes may be performed whenever each information is inputted, or after all the information has been inputted. Additionally, any method of completing the data entry could be used, and it could be automated.

Subsequently, the advertisement service company unit 20 modulates the inputted advertisement message and the subscriber information as recited in step S34. This is preferably done using the FSK modulation method for application to the cable/mobile communication company unit 30.

Then, when the input-completion process is performed, for example by keying in the "SEND" or "ENTER" key button, the advertisement service company unit 20 occupies a central office line in the off-hook state, as shown in step S35. This allows the cable/mobile communication company unit 30 to establish communications, make a telephone call, for example to the subscriber unit 40, as recited in step S36. The subscriber unit is preferably an opposite called party possessing the inputted telephone number. The advertisement service company next transmits the modulated advertisement message and the subscriber information to the cable/mobile communication company unit 30, as recited in step S37). At this time, the state mode of the character-inputting unit 21 of the advertisement service company unit 20 is returned from the off-hook state to the on-hook state, as shown in step S38.

During the above process, the advertiser 10 will preferably pay an advertising charge.

FIG. 3b is a flow chart illustrating a process in which the cable/mobile communication company unit 30 receives the advertisement message and the subscriber information transmitted from the advertisement service company unit 20, and performs subsequent operations.

Referring next to FIG. 3b, the cable/mobile communication company unit 30 receives and demodulates the contents of the transmission (the advertisement message, the subscriber's telephone number, etc.) as shown in step S39. In this example, the FSK demodulation method is used. At this time, the caller ID including the name and telephone number of the advertisement service company will also be demodulated using the same demodulation method.

The cable/mobile communication company unit 30 next modulates the demodulated contents, for example by using the FSK modulation method, and outputs a ring signal to the subscriber unit 40 (steps S40 and S41). The cable/mobile communication company unit 30 then transmits the advertisement service company (who is the caller) ID along with the advertisement message to the subscriber unit 40 (steps S42 and S43).

Referring next to FIG. 3c, a process in which the subscriber unit 40 receives and processes the advertisement message and the advertisement service company ID (caller ID) transmitted from the cable/mobile communication company unit 30 is described. Initially, the subscriber unit 40 receives an incoming ring signal, as shown in step S44.

The advertisement message and the advertisement service company ID (caller ID) are next received by the subscriber unit 40. The received contents identifying section 41 demodulates the received contents of the advertisement message and the advertisement service company ID (caller ID), as shown in step S45. Again, in this example the demodulation is performed by using the FSK demodulation method. The demodulated advertisement message and advertisement service company ID (caller ID) are then preferably displayed and listed by contents with each icon on the LCD section 42, and are then preferably stored in a memory of the subscriber unit 40 (steps S46 and S47).

At this time, when a ring signal is sent to the subscriber unit 40 from the cable/mobile communication company unit 30, the subscriber can either identify the received contents of the advertisement message along with the advertisement service company ID (caller ID) immediately, or read the received contents stored in the memory at any time later (step S48).

The subscriber can then optionally demand payment from the advertisement service company unit 20 of the corresponding amount of money for receiving and reading the advertisement message, as recited in step S49. The demand is sent to the proper advertisement service company unit 20 based on the advertisement service company ID (caller ID). This process can be done automatically, or can be done manually by the user.

The method and apparatus for transmitting and receiving a message using caller ID as claimed and broadly described herein, has several advantages. For example, when an advertiser requests an advertisement through an advertisement service company unit, the advertisement service company unit transmits the advertisement message along with the advertisement service company ID (caller ID) to the subscriber through a cable/mobile communication company unit. Consequently, the subscriber can identify both the contents of the advertisement message and the advertisement service company ID (caller ID). Additionally, this can either be done in real time, or can be done at any time later, after storing the information in a memory. Accordingly, the subscriber can easily demand payment of the charges for receiving the advertisement character message from the advertisement service company unit 20 based on the caller ID.

Additionally, while this method and apparatus has been described herein with reference to telephone calls, the service could be implemented on a computer network, and could also be implemented using instant messaging services.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for transmitting and receiving a message using a caller ID, comprising:

a first communications device having an embedded circuit to receive, modulate, and transmit information from an information provider, the information comprising an advertisement message;

a cable/mobile communication company switching device configured to receive the information from the first communications device and provide access to a communication network for the first communications device, the cable/mobile communication company switching device having an embedded circuit for demodulating the information and transmitting the information and at least one of a telephone number and name of the information provider as caller ID data; and a subscriber device configured to receive the information and the at least one of the telephone number and name of the information provider from the first communications device through the cable/mobile communication company switching device and the communication network as caller ID data when a ring signal is generated by die cable/mobile communication company switching device to the subscriber device, the subscriber device having an embedded circuit to demodulate the caller ID data, and a display unit to display the information and the at least one of the telephone number and name of the information provider;

wherein the first communicating device comprises a character inputting unit adapted to input the information in an on-hook state, and wherein the first communication device is adapted to occupy a telephone line and to send a ring signal when a predetermined button on the character inputting unit is keyed while in an off-hook state.

2. The apparatus of claim 1, wherein the subscriber device displays the information and the identify of the sender on the display unit.

3. The apparatus of claim 1, wherein the information is a text message.

4. The apparatus of claim 3, wherein the text message is an advertisement from an advertisement service company.

5. The apparatus of claim 1, wherein the first communications device is an advertisement service company communications device that generates an advertisement as the information, and the subscriber device is an advertisement service subscriber communications device that receives the advertisements from the advertisement service company communications device.

6. A method for transmitting and receiving an advertisement message using a caller ID, comprising:
   (a) providing an identification of at least one message recipient and an advertisement message to be transmitted to the at least one message recipient, the message comprising advertising information;
   (b) modulating the at least one message recipient's information, with the advertisement message and identification information of a message provider, the identification information including at least one of a telephone number and a name of the message provider; and
   (c) occupying a telephone line and transmitting a ring signal to the at least one recipient to send the advertisement message and the message provider Identification information to the at least one message recipient as caller ID data when a predetermined button of a character inputting unit is keyed while in an off-hook state;
   wherein steps (a) and (b) are performed while the character inputting unit is in an on-hook state.

7. The method of claim 6, wherein the steps of modulating the inputted advertisement service subscribers information and advertisement message, and information on a caller (calling party) and demodulating the received advertisement message and caller information are performed using FSK modulation/demodulation.

8. The method of claim 6, wherein step (a) further comprises completing the inputting of the at least one message recipient's information and the message, while the character inputting unit is in the on-hook state.

9. The method of claim 6, wherein a state mode of the character inputting unit is changed from the off-book state to the on-hook state after the completion of step (c).

10. A method for transmitting and receiving an advertisement message using a caller ID, comprising:
   receiving a ring signal and a corresponding caller ID data including an advertisement message and caller information, the caller information including at least one of a telephone number and a name of the message provider, and demodulating the received advertisement message and caller information, wherein the advertisement message is provided via a character inputting unit while the character inputting unit is in an on-hook state;
   displaying the demodulated caller Information on a display section;
   displaying the advertisement message on the display section, and listing the displayed advertisement message contents to store the listed advertisement message contents in a memory; and
   identifying the stored advertisement massage contents;
   wherein a telephone line is occupied and the ring signal and caller ID data is received after a predetermined button on the character inputting unit is keyed while in an off-hook state.

11. The method of claim 10, wherein the steps of modulating the inputted advertisement service subscribers information and advertisement message, and information on a caller (calling party) and demodulating the received advertisement message and caller information are performed using an FSK modulation/demodulation.

12. The method of claim 10, wherein the contents of the advertisement message displayed on the display section are listed with respective icons to score them.

13. The method of claim 10, wherein the contents of the advertisement message displayed on the display section are listed by the caller information or caller IDs to store them.

14. The method of claim 10, wherein the contents of the advertisement message displayed on the display section are listed by the caller information or caller IDs to store them, and payment of charges for the reception of the advertisement message is automatically requested.

15. A method for transmitting and receiving a message using a caller ID, comprising:
   (a) providing advertisement service subscriber information and an advertisement message;
   (b) modulating the advertisement service subscriber information and the advertisement message and sender identification information identifying at least one of a telephone number and a name of a sender of the advertisement message;
   (c) occupying a telephone line and transmitting a ring signal and caller ID data to the advertisement service subscriber when a predetermined button of a character inputting unit, that is used to input the advertisement subscriber information and the advertisement message, is keyed while in an off-hook state, the caller ID data including the advertisement message and the sender identification information;
   (d) receiving the ring signal and the caller ID data containing the advertisement message and the sender identification information by the advertisement service subscriber and demodulaong the received advertisement message and sender identification information; and
   (e) displaying the sender identification information and the advertisement message on a display;
   wherein steps (a) and (b) are performed while the character inputting unit is in an on-hook state.

16. The method of claim 15, further comprising listing the displayed advertisement message contents to store the listed advertisement message contents in a memory, and identifying the stored advertisement message contents.

17. An apparatus for transmitting and receiving a message using caller ID, comprising:
   an input circuit, to receive and modulate message data and an identification signal from a message sender, wherein the message data comprises an advertisement message from the message sender, and wherein the identification signal includes at least one of a telephone number and a name of the message sender;
   a communications circuit, coupled to receive and demodulate the modulated message data and receive the identification signal from the input circuit and generate a caller ID message including the message data and the identification signal; and a receiving terminal, coupled to receive the caller ID message including the message data and the identification signal from the communications circuit when a ring signal is received from the communications circuit;

wherein the input circuit comprises a character inputting unit adapted to input the message data in an on-kook state, and wherein the communication circuit is adapted to occupy a telephone line and to send the ring signal when a predetermined button on the character inputting unit is keyed while the character inputting unit is in an off-hook state.

18. The apparatus of claim 17, wherein the communications circuit comprises a communications service provides that provides a communications channel between the input circuit and the receiving terminal.

19. The apparatus of claim 18, wherein the communications service provider is a telephone company.

20. The apparatus of claim 17, wherein the identification signal uniquely identifies the input circuit.

21. The apparatus of claim 17, wherein the input circuit comprises an input port for receiving the message data, a modulator to modulate the message data, and a modem to output the modulated data.

22. The apparatus of claim 17, wherein the communications circuit comprises an input port to receive the modulated data and the identification signal, a demodulator to demodulate the received message data, and a transmitter to transmit the received message data and identification signal.

23. The apparatus of claim 22, wherein the transmitter comprises a modulator to modulate the received message data and identification signal for transmission, and an exchange to establish a communication channel between the input circuit and the receiving terminal.

24. The apparatus of claim 23, wherein the exchange is a public switched telephone network.

25. The apparatus of claim 23, wherein the exchange is a wireless telephone network.

26. The apparatus of claim 17, wherein the receiving terminal comprises a display panel to display the message data and the identification of the input circuit.

27. The apparatus of claim 17, when the receiving terminal comprises a telephone and a caller ID terminal.

28. A method for transmitting and receiving a message using a caller ID, comprising:

(a) providing advertisement service subscriber information and an advertisement message by an advertisement message sender;

(b) modulating the advertisement service subscriber information and the advertisement message, and identification information of the advertisement message sender, the identification information including at least one of a telephone number and a name of the advertisement message sender;

(c) transmitting the modulated advertisement service subscribers information, the advertisement message, and the identification information;

(d) receiving and demodulating the transmitted advertisement service subscribers information, advertisement message, and identification information;

(e) modulating the demodulated advertisement message and identification information, occupying a telephone line and transmitting a ring signal and a corresponding caller ID data containing the modulated advertisement message and identification information to at least one advertisement service subscriber when a predetermined button of a character inputting unit that is used to input the advertisement service subscribe information and the advertisement message is keyed while in an off-hook state;

(f) receiving the transmitted ring signal and corresponding caller ID data containing the advertisement message and identification information, and demodulating the received advertisement message and identification information; and (g) displaying the demodulated identification information and the contents of the demodulated advertisement message on a display;

wherein steps (a) and (b) are performed while the character inputting unit is in an on-hook state.

29. The method of claim 28, further comprising listing the displayed advertisement message contents to store the listed advertisement message contents in a memory, and identifying the stored advertisement message contents.

30. A method for receiving a message using a caller ID, comprising:

receiving a ring signal and a corresponding caller ID data from an information service provider, wherein the caller ID data comprises an identification of the information service provider and a text message from the information service provider, wherein the text message is provided via a character inputting unit while the character inputting unit is in an on-hook state, and wherein a telephone line is occupied and the ring signal and caller ID data is received after a predetermined button of the character inputting unit is keyed in an off-hook state; and at least one of displaying the caller ID data on a display screen and storing the caller ID data in memory.

31. The method of claim 30, wherein the information service provider is an advertiser and wherein the text message from the information service provider is an advertisement.

32. The method of claim 30, wherein a communication company switching device receives the text message from the information service provider along with the identification of the information service provider and an identifier of at least one intended recipient and establishes a call to the at least one intended recipient to transmit the caller ID data.

* * * * *